Sept. 26, 1950     B. WILSON     2,523,749
PRECOOLER FOR SHIPPING COMPARTMENTS
Filed April 17, 1946     8 Sheets-Sheet 1

INVENTOR
BROADUS WILSON
BY
Elizabeth Newton Dew
ATTORNEY

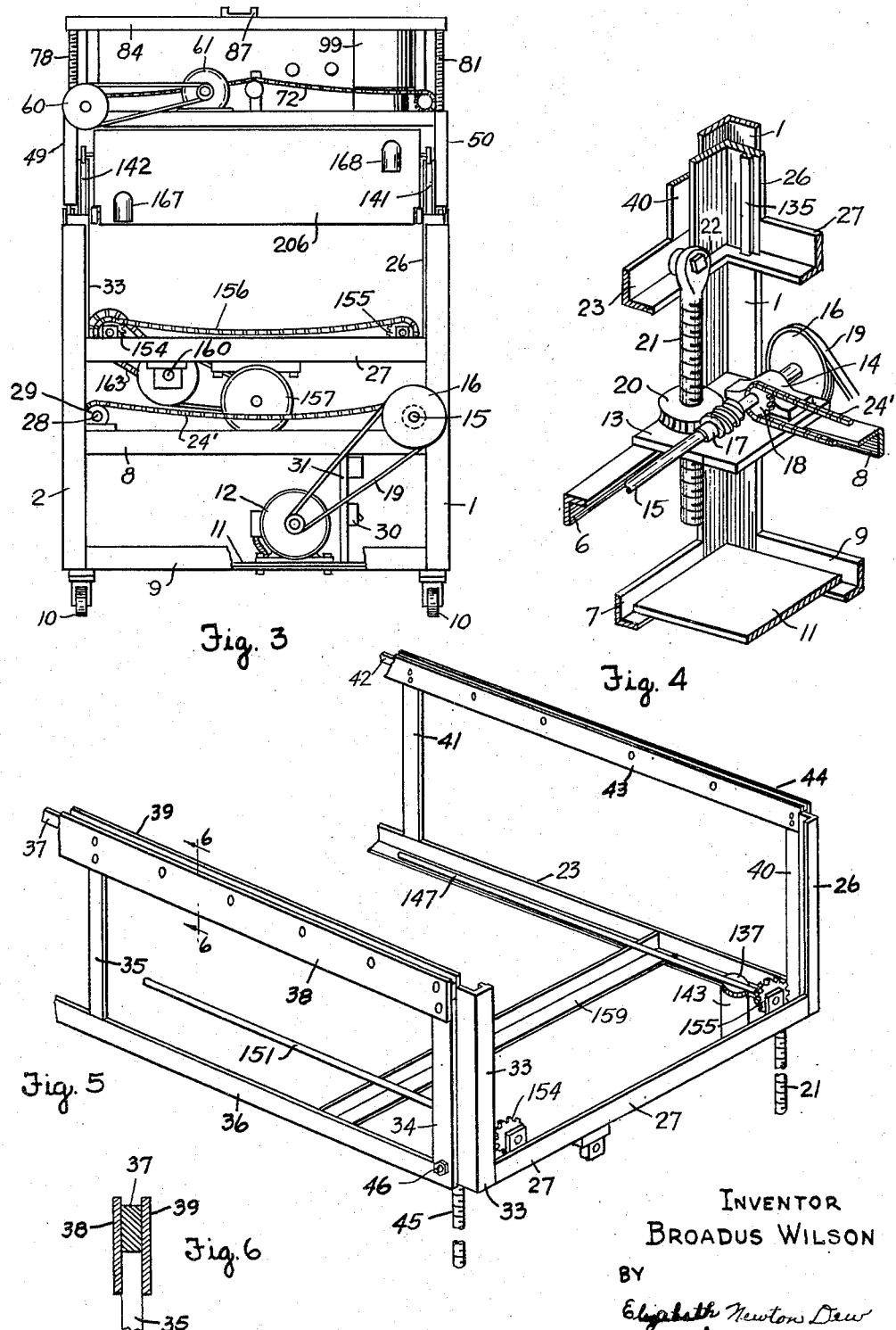

Sept. 26, 1950          B. WILSON          2,523,749
PRECOOLER FOR SHIPPING COMPARTMENTS
Filed April 17, 1946          8 Sheets-Sheet 3
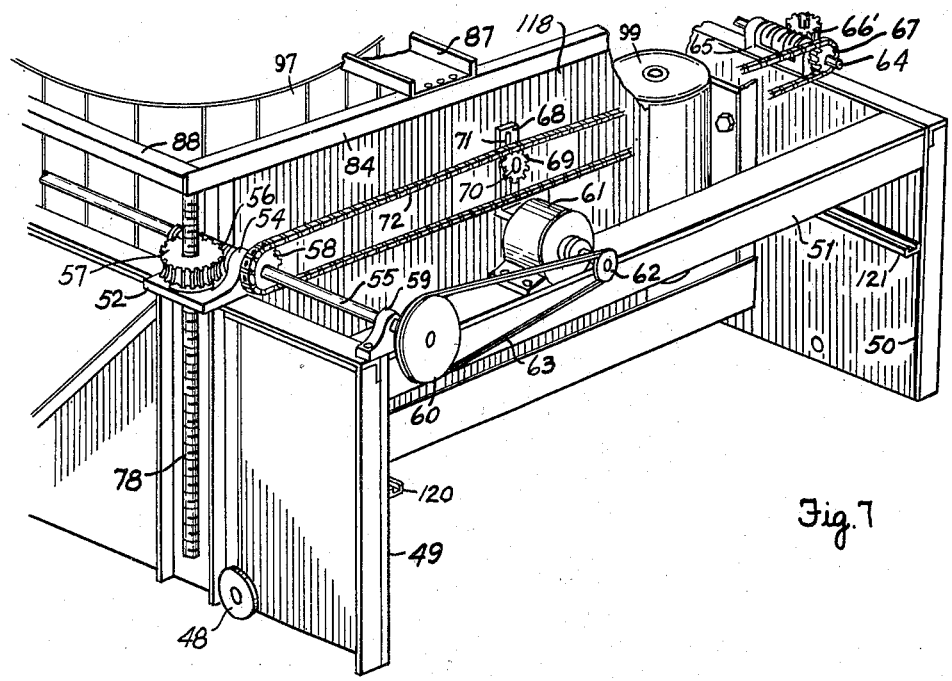
INVENTOR
BROADUS WILSON
BY
Elizabeth Newton Dew
ATTORNEY Sept. 26, 1950

B. WILSON 2,523,749

PRECOOLER FOR SHIPPING COMPARTMENTS

Filed April 17, 1946

INVENTOR
BROADUS WILSON
BY
Elizabeth Newton Dew
ATTORNEY

Sept. 26, 1950            B. WILSON            2,523,749

PRECOOLER FOR SHIPPING COMPARTMENTS

Filed April 17, 1946            8 Sheets-Sheet 5

INVENTOR
BROADUS WILSON
BY
Elizabeth Newton Dew
ATTORNEY

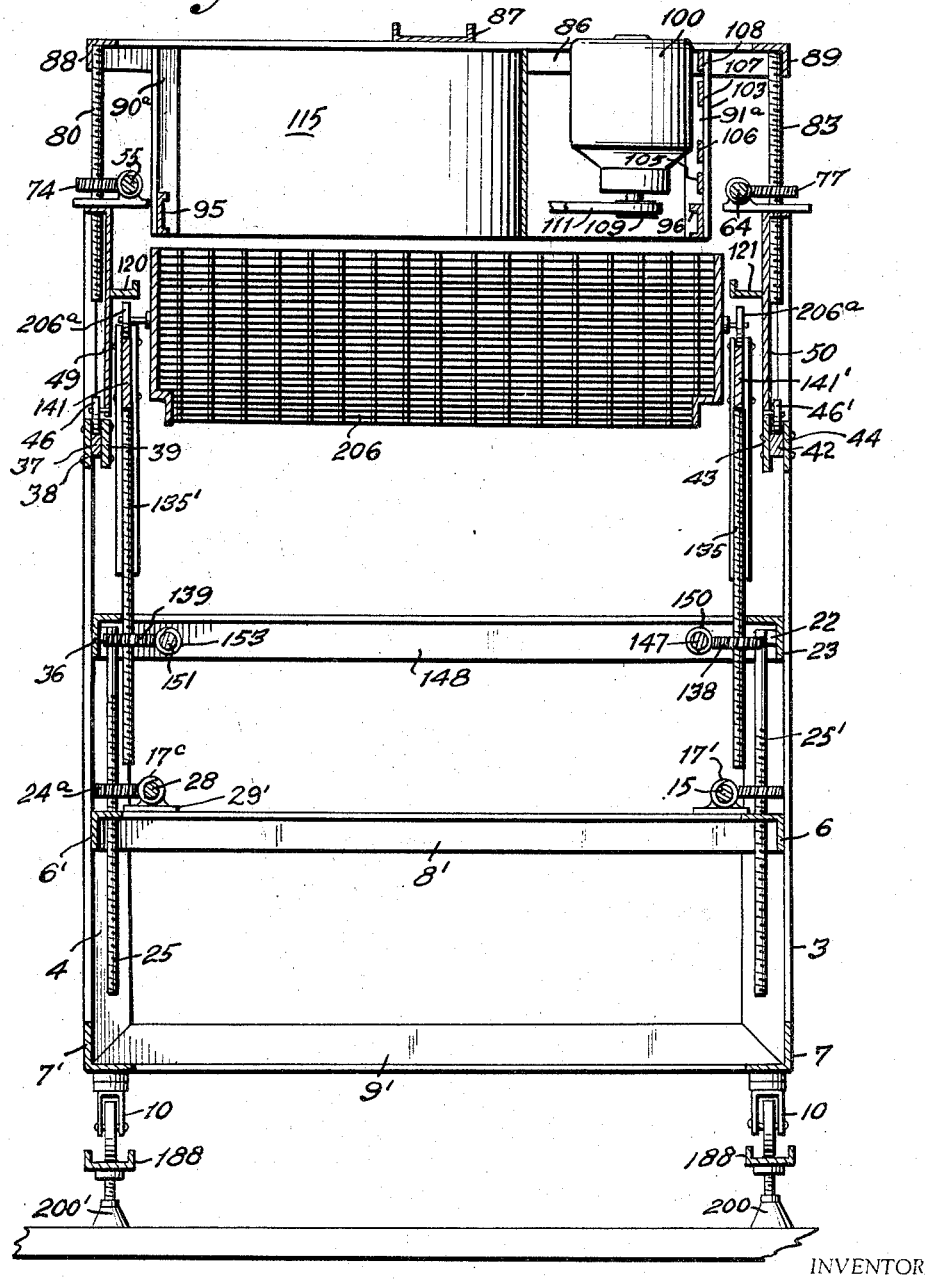

Sept. 26, 1950        B. WILSON        2,523,749
PRECOOLER FOR SHIPPING COMPARTMENTS
Filed April 17, 1946        8 Sheets-Sheet 7
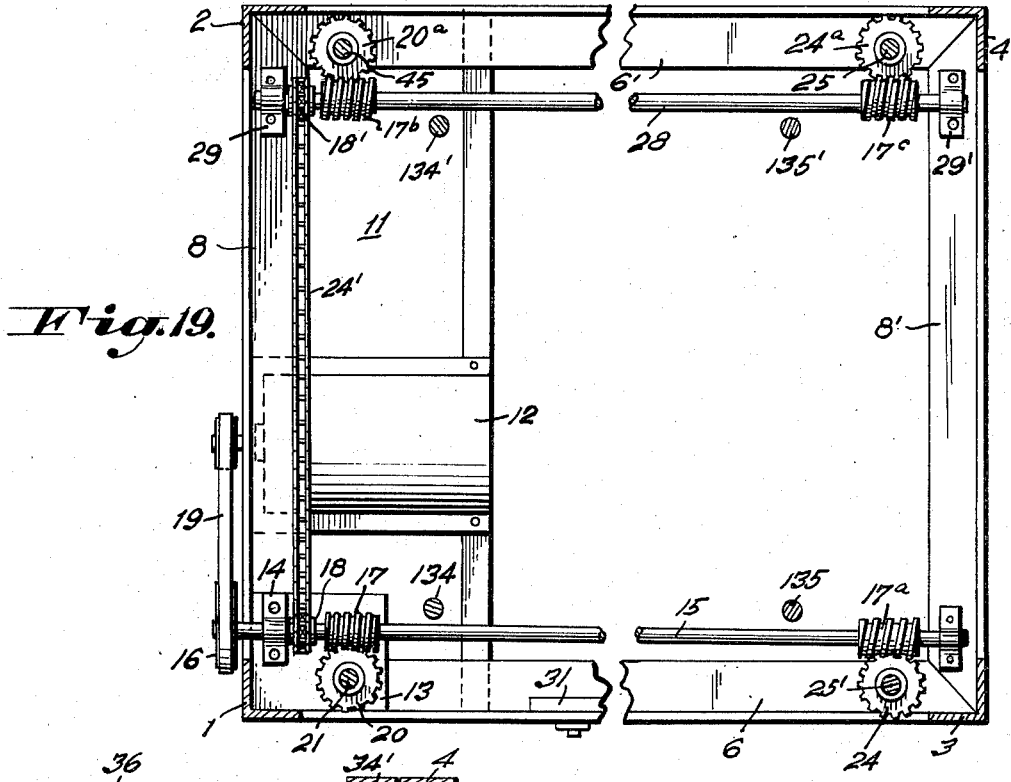
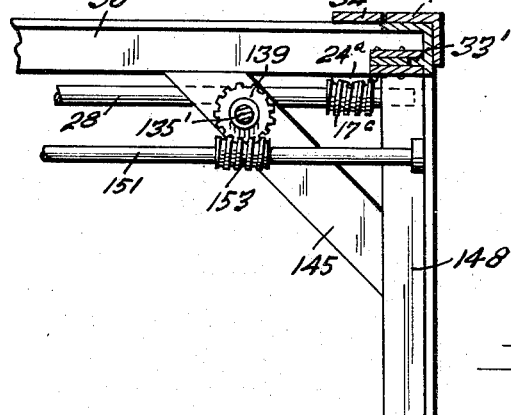
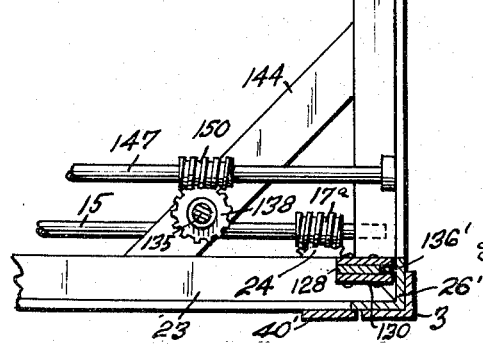
Inventor
Broadus Wilson
By Elizabeth Newton Dew
Attorney Sept. 26, 1950   B. WILSON   2,523,749
PRECOOLER FOR SHIPPING COMPARTMENTS
Filed April 17, 1946   8 Sheets-Sheet 8

INVENTOR
BROADUS WILSON
BY
Elizabeth Newton Dew
ATTORNEY

Patented Sept. 26, 1950

2,523,749

UNITED STATES PATENT OFFICE 2,523,749

PRECOOLER FOR SHIPPING COMPARTMENTS

Broadus Wilson, Raleigh, N. C., assignor to Aeroglide Corporation, a corporation of North Carolina Application April 17, 1946, Serial No. 662,808

25 Claims. (Cl. 62—24)

This invention relates to apparatus for pre-cooling quantities of fruits or vegetables prior to shipment. In shipping perishable products such as crated fruit it is customary to pre-cool the products after they have been packed in a refrigerator car but before shipment has begun. Not only does such pre-cooling prevent much spoilage that would otherwise occur, it also reduces to a minimum the expenses of icing the car during transit.

Heretofore it has been customary to pre-cool a loaded refrigerator car by circulating chilled air through the lading from supply and exhaust conduits temporarily inserted into the car, the air being cooled by passing over coils located externally of the car. Portable air cooling and circulating mechanisms temporarily set up within the car itself have also been proposed. However, neither method has proven entirely satisfactory. In the first case, the apparatus, particularly the air conduits, are bulky and difficult to handle expeditiously. Also it is difficult to seal the space between the conduits and the door opening as is necessary if large power losses are to be avoided and rapid cooling attained. In the second case, the apparatus heretofore used, while temporarily located in the car itself and efficient and satisfactory in most respects, has been so large as to tend to limit the maximum loading of the car that would otherwise be possible.

It is therefore an object of my invention to provide a pre-cooling unit that may be quickly and easily inserted into and removed from a loaded car of fruits, vegetables, or other perishable products, and that requires a minimum of space above the load for placement.

A further object is to provide a pre-cooling unit in two sections wherein one section may first be inserted in the space between the top of the lading and the top of the door opening, then raised to the top of the car, to thereby afford a space within which a second unit or section may be inserted.

Another object is to provide a pre-cooling apparatus constructed in sections, as aforesaid, in which a first section comprises an air-circulating unit and a second section comprises a unit for circulating chilled liquid in heat-exchanging relation with air circulated by the first section.

A still further object is to provide a truck unit for handling the aforesaid sections expeditiously and for facilitating their placement in, and removal from, a loaded car or other shipping compartment.

Another object is to provide a blower section formed of two parts relatively movable in a normally-vertical direction, together with power-driven elevating means whereby one part may be elevated with respect to the other when the section is in desired position within a car.

Still another object is to provide a novel track and supporting unit for supporting the sections of the cooling unit within the car.

Another object is to provide a truck adapted to support the two sections aforesaid, and to individually mount them for guided translation along parallel paths, while at the same time affording power-driven means whereby the heighth of such paths above a supporting surface may be separately and selectively varied.

Other objects and advantages of the invention will become apparent as the description proceeds.

In the drawings:

Fig. 3 is a front elevation showing the blower unit elevated into the top of a car and the cooling or coil unit moved into position over the lading in the space previously occupied by the blower or fan unit.

Fig. 4 is a perspective detail view showing one of the four elevator screws for the track frame supporting the blower unit, whereby the heighth of the tracks may be adjusted for different types of cars and heighths of lading.

Fig. 5 is a perspective view of the forward half of the blower track support, it being understood that the two ends are essentially of the same construction, the cooling coil elevating motor and its driving connections being omitted for clarity of illustration.

Fig. 6 is a detail view taken on a plane indicated by the line 6—6, Fig. 5.

Fig. 7 is a perspective view on an enlarged scale, of the front portion of the fan unit.

Fig. 8 is a front elevation of the frame of that part of the fan unit mounting the fans and their driving motors.

Fig. 9 is a detail elevation on the same scale as Fig. 8, showing one of the two identical motor supports.

Fig. 18 is a vertical cross-sectional view taken in a plane identified by the line 18—18, Figure 2.

Figure 19 is a horizontal cross-sectional view taken in a plane identified at 19—19, Figure 2.

Figure 20 is a horizontal section taken in a plane indicated by the line 20—20 of Figure 2.

Figure 1:
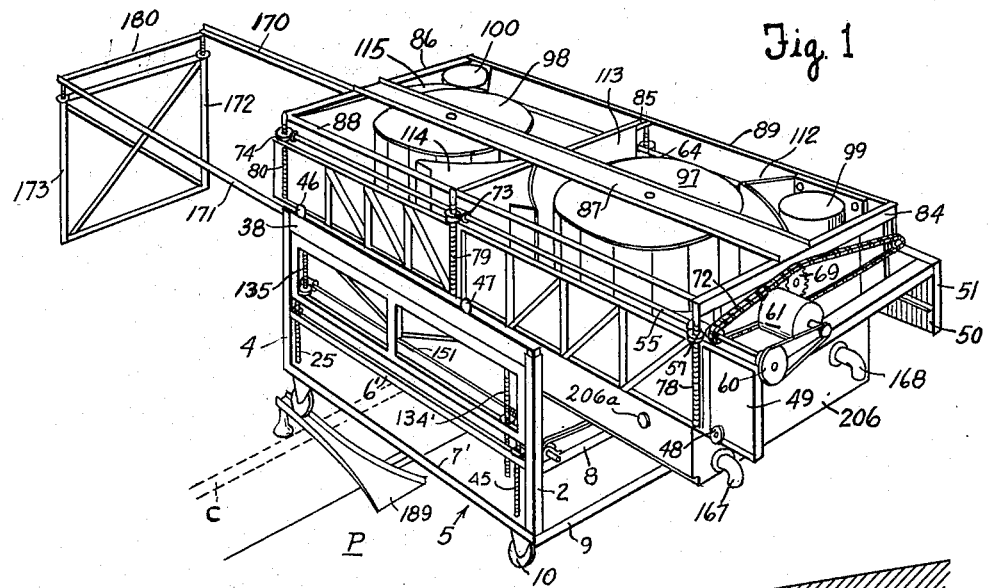
Fig. 1 is a perspective view of the apparatus showing the parts in position just prior to movement of the blower unit into a car.
Figure 2:
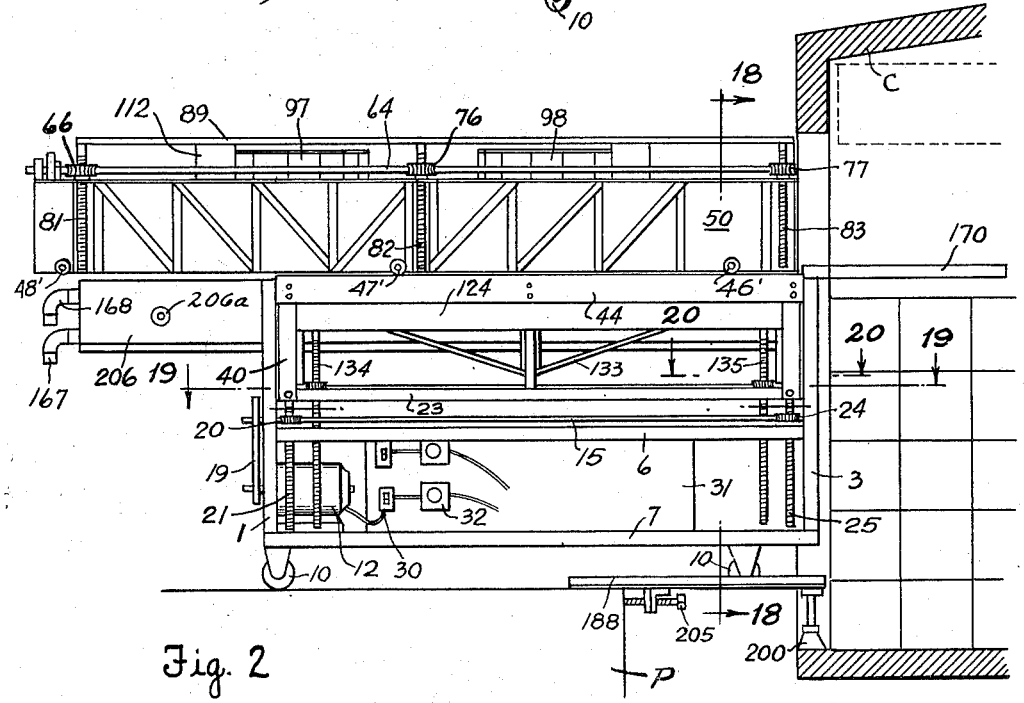
Fig. 2 is an elevation of the right side of the apparatus in position ready for movement of the blower unit into a car loaded with crates of fruit or vegetables.

Referring in detail to the drawings, the numeral 5 indicates generally a carrier base or frame. As best shown at Fig. 2 this frame is formed of angle irons, preferably welded together, and consists of four uprights identified by numerals 1 to 4, inclusive, at the corners of a rectangle having a width a little less than the door opening of the car which the apparatus is intended to service, and a length equal to about 75 per cent of the length of the blower and coil units hereinafter described. The uprights 1 and 3 are rigidly connected by side horizontals 6 and 7, Figures 2, 4, 18 and 19. Likewise uprights 2 and 4 are connected by side horizontals 6' and 7', Figures 1, 18 and 19. Front uprights 1 and 2 are connected by horizontals 8 and 9, Figure 3 and rear uprights 3 and 4 are connected by horizontals 8' and 9', Figure 18. It will be noted that the upper horizontals 6, 6', 8, 8' are attached to the verticals about half way between the ends thereof. The carrier base 5 is mounted upon swivel casters 10 so that it may be rolled about on the loading platform P, Figures 1 and 2.

As seen at Figures 3, 4 and 19, a plate 11 extends across the frame 5 at the forward lower end thereof and is fixed to the coplanar horizontal flanges of lower horizontal side members 7 and 7' and forward end member 9. This plate forms a support for a motor 12. Fig. 4 shows the forward right corner of the carrier base or frame and its associated portion of the blower track support and it will be understood that, except for the belt driving pulley 16 there shown, the other corners are of similar constrduction. A substantially square plate 13 is fixed to the upper flanges of members 6 and 8 and carries a bearing 14 journalling a shaft 15 to which are secured a belt pulley 16 forwardly of horizontal 8, a worm 17, and a chain sprocket 18. The pulley is connected by belt 18 with a pulley on the shaft of motor 12 as clearly shown upon Figure 3. A worm or "Boston" gear 20 is mounted in an antifriction bearing, not shown, for rotation upon plate 13, and meshes with worm 17. Gear 20 is threaded to receive an elevating screw 21 that has an eye formed at its upper end, secured by bolt 22 to one side member 23 of a blower track support, subsequently described.

Sprocket 18 carries a chain 24' which passes over and about an identical sprocket 18' on a shaft 28 mounted similarly to shaft 15, at the other side of the frame, whereby the two shafts are synchronously rotated. As seen at Figures 2 and 19, shaft 15 extends along the side of the frame to the rear thereof, where it is journaled in a bearing and has fixed thereto, a worm 17a identical with 17 and in mesh with a worm gear 24 threadedly engaging an elevating screw 25', identical with 21. It will thus be seen that the blower track support member, of which angles 23, 26 and 27, Fig. 4, are parts and which will be subsequently described in detail, is carried by four identical elevating screws, one at each corner, that screws 21 and 25' at one side are elevated by rotations of worm gears 20 and 24, respectively, which, in turn, are rotated by shaft 15. The counterpart of shaft 15, is identified at 28, Figures 3, 18 and 19, where it is seen to be journaled in a forward bearing 29 and a second like bearing 29' at the rear. Shaft 28 carries a sprocket 18' and worms 17b and 17c, Figure 19, identical with those on shaft 15, each worm being in mesh with worm gears 20a and 24a corresponding to gears 20 and 24. Since shafts 15 and 28 are connected by chain 24' for synchronous rotation, operation of motor 12 acts to synchronously rotate all four worm gears and thus to elevate the blower track support of which the forward half is shown at Figure 5 and the rearward half at Figure 20. Control of motor 12 is effected by a switch 30 conveniently mounted upon a control panel 31 fixed in vertical position to the frame 5. A junction box for lead-in wiring to motor 12 is mounted on panel 31, as indicated at 32, Fig. 2. Motor 12 may be a conventional, reversible, single-phase machine of one-third or one-fourth horsepower.

Figure 12:
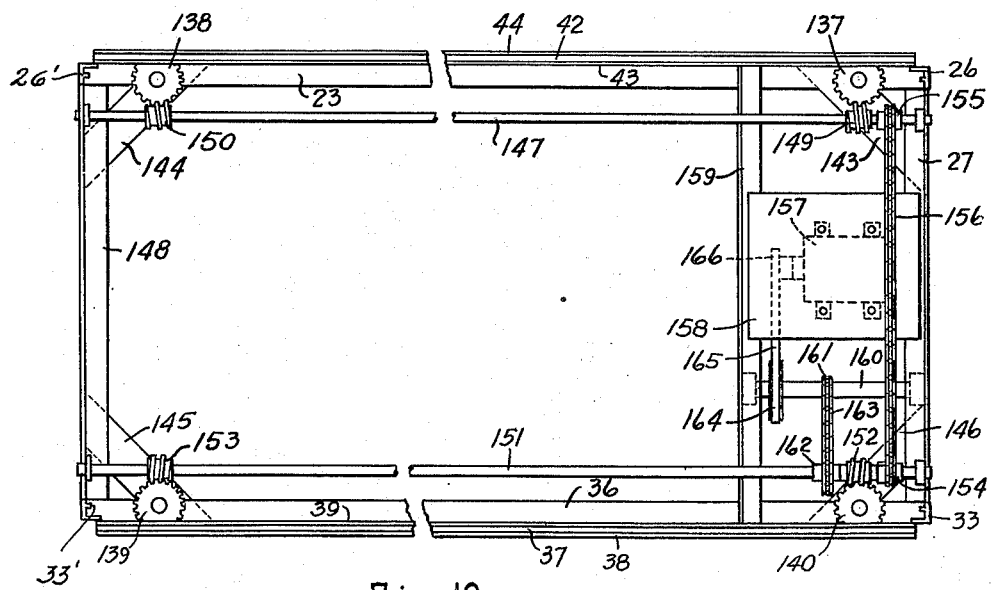
Fig. 12 is a plan view of the blower track support showing the arrangement of the motor, jack shaft, worm shafts, and connections for elevating the cooling coil unit with respect thereto.

The blower track support which is mounted at its four corners upon the upper ends of screws 21, 45, 25, and 25', is built up from standard metal bars and preferably has welded joints. As shown at Fig. 5, it is in the general form of a parallelopiped. The two forward uprights 26 and 33 are joined at their lower ends by the end piece 27 while the two rear uprights 26' and 33' are similarly connected by end piece 148. Upright 33 has a bar 34 secured in slightly overlapping relation to its rear outside edge. A like bar 34' is located at the rear corner of the support and the ends of 34, 34' and center bar 35 are joined by an angle 36 at the bottom, and a bar 37 at the top. See Figures 5, 6 and 20. A pair of side plates 38 and 39 having about two and one-half times the width of bar 37, are secured to its opposite sides and to uprights 34, 35 and 34', as by bolts or rivets. The relation is such that the upper edges of side plates 38 and 39 project about three-eighths of an inch above the top of bar 37, to form therewith a channel or track within and along which rollers 46, 47 and 48, of the fan housing, are adapted to roll. See Fig. 1. The other side is similarly constructed so that it is sufficient to identify front upright 26, rear upright 26', lower angle 23, vertical bars 40, 41 and 40', track bar 42 and side plates 43 and 44. Also identified are jack screws 21 and 45 at the opposite front corners of the support and 25 and 25' at the corresponding rear corners. Figure 20 shows the rear portion of the frame and its mounting between uprights 3 and 4 of frame 5. Referring to Figures 12 and 20, triangular plates 143 to 146 are secured at the corners of the frame and brace the same against distortion in a horizontal plane.

By the foregoing construction, rotation of motor 12 synchronously rotates the four worm gears 20, 20a, 24 and 24a at the four corners of the blower track support, so that the tracks are elevated equally to such heighth as may be necessary to bring the tracks a little above the top of the lading in the car.

The blower or fan unit consists of two parts that are relatively movable in a vertical direction by means of a self-contained power-driven elevator. Figures 7 and 18 show the front end portion of the fan unit. A pair of built up side plates or beams 49 and 50 are provided. Each beam comprises in general, a rectangular steel plate reinforced along its edges with lengths of angle iron, and also having transverse reinforcements, as shown in Figs. 1, 2 and 7. Connections between the several component parts of each beam may be effected by welding or riveting, as desired. As best seen in Fig. 7, the two beams 49 and 50 are connected at their front upper corners by a beam 51 which may consist of a length of angle iron. The beams are connected at the rear upper corners by a second beam not shown but identical with 51. Beam 49 has a bearing pad 52 secured to its upper edge and spaced a little back of its forward edge. This pad has a bearing 54 journaling a shaft 55. A worm 56 is fixed to shaft 55 and meshes with the threaded worm gear 57 journaled on pad 52 by an antifriction thust bearing, not shown. A small sprocket wheel 58 is secured to shaft 55 adjacent bearing 54.

Shaft 55 extends forwardly through a bearing 59 and has a belt pulley 60 secured to its forward end. A motor 61, which may be a reversible, single-phase machine of fractional horse power, is bolted to beam 51 and has a belt pulley 62 on its shaft. Belt 63 connects pulleys 60 and 62. These parts are duplicated at the other side, except of course, for pulley 60, so that it is deemed sufficient merely to identify shaft 64 (Figs. 7 and 18), bearing pad 65, worm gear 66′, and sprocket 67. A bracket 68 is attached to beam 51 and carries an idler sprocket 69 journaled on a stud 70 that may be adjusted along a slot 71 in bracket 68 to thereby effect proper tension in a chain 72 connecting the identical sprockets 58 and 67 by synchronous rotation, as will be obvious from inspection of Fig. 7. From Figs. 1 and 18 it will be noted that shafts 55 and 64 extend to the rear end of their respective beams and that each carries three worms, in mesh with worm gears such as 57, 73 and 74 for shaft 55, and (see Figs. 2 and 18), 66, 76 and 77 for shaft 64, whereby rotation of motor 61 drives all worms synchronously. As seen at Figure 7, a pair of horizontal track members 120 and 121 which may comprise length of channel iron with one side turned outwardly to form a "reverse flange," are secured to the inside faces of the respective beams 49 and 50. These members form a track on and along which the cooling coil unit may be moved into the car when the blowers have been elevated in the manner subsequently described. Each of the worm gears 57, 73, 54, 66, 76 and 77 engages a threaded rod as shown at 78, Fig. 7, for worm 57 and at Fig. 18 for worm gears 74 and 77 and their threaded rods 80 and 83, respectively. These rods or elevator shafts are identified as 78, 79 and 80, for the left-hand side of the machine, as seen in Fig. 1, and 81, 82 and 83, for the right-hand side as seen in Fig. 2. Rods 78 and 81 form a pair, as do rods 79, 82 and 80, 83. Each pair of rods are attached at their top ends by cross pieces of angle iron 84, 85 and 86, Figure 1, which may conveniently be welded or bolted to the rods. The cross pieces are connected at their central portions by a heavy channel section 87, and at their ends by angle sections 88 and 89 extending horizontally along each side. See also Fig. 18.

Fig. 8 shows the front end of the frame mounting the blowers and their driving motors. It will be understood that this construction is typical and that a substantially identical construction is provided at rods 79 and 82 and at 80 and 83. The cross piece 84, also identified in Figures 1 and 7, has vertical angle sections 90 and 91 attached thereto a distance from its end sufficient to clear plates or beams 49 and 50. At their bottom ends, these verticals are united by a plate 92, reinforced along its top and bottom edges, by cross pieces 93 and 94. At the left lower edge, a longitudinal channel or stringer 95 also shown in cross section upon Fig. 18, is connected with cross pieces 93 and 94. This stringer extends the full length of the frame and is attached at the rear to vertical 90a, Fig. 18. Likewise, a channel or stringer 96 (Figs. 8 and 18) extends along the lower right corner of the fan frame and is attached to front vertical 91 and rear vertical 91a, Fig. 18.

In the model selected for illustration, two standard centrifugal blowers are used, each connected to be driven by a respective three-phase motor of about three horse power. In Figs. 1 and 2, the forward blower is identified as 97 and its driving motor as 99. The rear blower is shown at 98 and its driving motor at 100. Motor 99 also appears in Figs. 7 and 8 and motor 100 in Fig. 18. Each blower is journaled in a top bearing carried by central channel 87, and a lower bearing carried by a cross channel such as that shown at 101, Fig. 9, for blower 98, the center line of whose shaft is shown at 102. From Figs. 9 and 18 it will be noted that the mounting for motor 100 comprises a pair of vertical angle sections 103 and 104. The sections are secured at their lower ends to channel 96 and section 103 is attached at its upper end to cross piece 86. The two vertical sections are connected by four straps 105, 106, 107 and 108 to form a rigid support to which the base of motor 100 may be bolted with its shaft vertical. The frame for motor 99 is of identical construction. As seen in Fig. 8, motor 99 has a pulley 109 upon the lower end of its shaft, connected by a belt 111 to the pulley 110 of blower 97. As clearly shown in Fig. 1, shroud plates 112 and 113 are positioned about the rotor of blower 97 to direct air laterally in oppositely-directed streams. Likewise, shroud plates 114 and 115 are provided for blower 98. Three-phase current is supplied to motors 99 and 100 by wiring, not shown, leading from receptacles 116 and 117 (Figure 8) mounted upon the forward bulkhead plate 118. By the foregoing construction, operation of motor 61 synchronously rotates all six worm gears 57, 66, 73, 74, 76 and 77, to elevate the blower frame, the blowers and their motors, to a maximum elevation a little above the top edges of beams 49 and 50, wherein the fan outlets are unobstructed by said beams and the blowers when in operation, draw air upwardly over the cooling coils of the cooling unit when the latter is rolled into the car on tracks 120 and 121, into position beneath the blower frame, and impel the chilled air horizontally toward both ends of the car. The bottom of the blower frame is substantially open and unobstructed.

The cooling coil unit includes a generally rectangular frame with open top and bottom and upon which a number of connected coils or pipes are carried. The frame has a series of aligned rollers on each side, adapted to mount the unit for translation into the car as will presently to be described.

Figure 10:
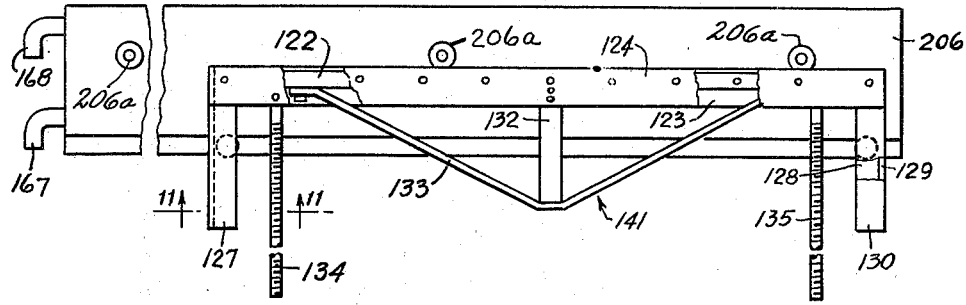
Fig. 10 is a side elevation of one of two identical cooling coil support tracks, and its elevating screws, together with the coil unit translatably mounted thereon.
Figure 11:
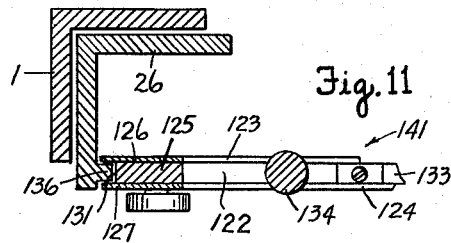
Fig. 11 is a sectional detail view taken upon the line 11—11 of Fig. 10.

The support for the coil unit consists of two identical track members. One of these members is shown at 141, Figs. 10 and 11, and comprises a central strip of metal 122, to opposite sides of which are riveted a pair of wider plates 123 and 124. The plates are arranged with top edges a little above the top edges of central strip 122 to form a channel or track in and along which the rollers on the sides of the coil frame may travel. As shown in Fig. 11, the plates 123 and 124 project beyond strip 122 at each end of the track, to receive therebetween vertical bars such as 125. The vertical end edges of the plates project a little beyond the outer vertical side edges of bars 125 and vertical side plates 126 and 127 are rigidly attached to 125 with their outer vertical edges flush with the aforesaid end edges of plates 123 and 124 to thereby form a vertical channel or guideway 131. The other end of the track member is of like construction so that it is sufficient to identify vertical bar or strap 128, Fig. 10, and vertical side plates 129 and 130. A central vertical brace 132 has its upper end fixed between plates 123 and 124, and a reinforcing rod 133 is attached at its ends to strip 122 between plates 123 and 124 and passes beneath and is there secured to the lower end of brace 132. A jack screw 134 is fixed at its upper flattened end to and between the front ends of plates 123 and 124. A second jack screw 135 is similarly fixed to and between the rear ends of plates 123 and 124. As previously stated, the other of the two track members is identical in construction with the one just described.

Each of the track members just described is of a length to have a smooth fit between a respective pair of front and rear uprights of the blower track support. For example, at the right hand side, the front upright, previously described, is identified at 26 and appears in Figures 3, 4, 5, 11, and 12. The right rear upright is identified at 26', Figure 12. The right track member of the cooling coil support, shown in Figure 10, is guided for vertical movement between and along uprights 26 and 26' by reason of the guideways such as 131, Figure 11, and coacting projection 136, secured to upright 26. The construction whereby the rear upright 26 guides the right track member, is identical in all respects with that shown at Figure 11. The left track member of the cooling coil support is, of course, identical with the right member, just described, and is guided for vertical movement by and along left front upright 33, Figures 3, 5, and 12, and left rear upright 33', Figure 12, of the blower track support. Each of these uprights has a projection 136 welded or otherwise secured in vertical position along its face. These projections have a width a little less than that of guideways 131. By this construction each track member 141 and 141', Fig. 18, is mounted for guided vertical movement on and along the blower track support and while moved as a unit therewith on operation of motor 12, is also independently movable in vertical direction relatively to the blower track support by mechanism presently described.

Two pairs of "Boston" gears or worm gear nuts, 137, 138 and 139, 140, support the tracks 141 and 142 by engagement with the respective jack screws, of which, 134 and 135, for the right hand track 141, have been described. The gears 137 and 138 of one pair, (see Figure 12) are rotatably mounted by antifriction bearings, not shown, on the front and rear, triangular brace plates 143 and 144, respectively, of the blower track support. A shaft 147 is journaled in bearings carried upon the end horizontal members 27 and 148 of the blower track support and has worms 149 and 150 fixed thereto in mesh with the adjacent "Boston" gears, 137 and 138, respectively. In addition, shaft 147 has affixed thereto a sprocket 155.

The second pair of "Boston" gears 139 and 140 are journaled on horizontal plates 145 and 146 of the blower track support. A second shaft 151 is journaled in bearings fixed to the other ends of the front and rear horizontal members 27 and 148. This shaft has worms 152 and 153 affixed thereto at opposite ends, each in mesh with a respective one of the second pair of "Boston" gears 139 and 140. A small sprocket 154 is fixed to the forward end of shaft 151. This sprocket is equal in size with and is positioned laterally opposite sprocket 155 and is connected for synchronous rotation therewith by a chain 156. The two shafts 147 and 151 are driven by a fractional horsepower motor 157 bolted to the under side of a plate 158 that, in turn is attached at one end to the horizontal flange of horizontal member 27, and at the other end to a second horizontal member 159, spaced rearwardly of member 27 and affixed at its ends to the side members 23 and 36. A counter-shaft 160 is journaled in bearings carried by horizontals 27 and 159. This counter-shaft has a small sprocket 161 fixed thereto which is connected to drive sprocket 162 fixed on shaft 151 by a chain 163. Counter-shaft 160 also has a large belt pulley 164 fixed thereon, connected by belt 165 to be driven from a small pulley 166 upon the shaft of motor 157. Thus, as motor 157 operates, it drives counter-shaft 160 and shafts 147 and 151, at reduced speed, to rotate all four "Boston" gears 137 to 140, inclusive, in synchronism, and thus acts through jack screws 134, 135, 134' and 135', Figs. 1, 2, 10 and 20, to elevate in unison the two coil unit supporting tracks and the cooling coil unit 206 thereon. Plate 158, motor 157 and its driving connections with shaft 151 are clearly shown upon Figure 12 and have been omitted from Figure 5 to more clearly illustrate the frame construction.

The cooling coil unit itself, identified generally at 206, Figs. 1, 2, 3 and 18, is of conventional construction so that it is deemed unnecessary to show and describe it in detail. Suffice it to say that it consists of a generally rectangular framework with open top and bottom, and enclosed by metal plates on its four sides. A supply header (not shown) and an exhaust header extend in horizontal, vertically-spaced relation across the front of the unit. These headers are connected by coolant-conducting heat-exchange piping which, if desired, may have fins thereon to increase the heat-exchange area. Supply and exhaust couplings 167 and 168, Figures 2 and 3, are in communication with the respective headers and afford means by which chilled liquid such as brine, from an adjacent refrigeration unit (not shown) may be conducted to and forced through the coils. If desired, baffles may be inserted between coils or groups of coils to increase, in a known manner, the length of the flow path of the air over and about the coils.

Any suitable known heat-exchange means may be satisfactorily employed, and reference is made to the co-pending application of Hipolit M. Hincz, Ser. No. 589,917, filed April 23, 1945, now Patent 2,477,250, dated July 26, 1949, for a specific disclosure of one suitable form of cooling coil unit, as just described.

Current may be led to the several motors from switches located upon panel 31, by lengths of flexible insulated cable (not shown). The control of all motors at a central panel, enables control by one person, and facilitates accurate and precise operation as well as rapid insertion of the unit into a car and withdrawal therefrom. Automatic stoppage of the motors is contemplated by vertically adjustable stop switches located in the paths of the several tracks, or parts moving therewith, whereby each of the three elevator motors is automatically stopped when the pair of tracks under its direct control, reach their desired elevation. As seen in Figs. 10 and 18, the sides of the cooling coil unit 206 carry rollers 206a by which the unit is mounted for easy translation on and along tracks 141 outside the car, and tracks 120 and 121 which, as previously described, are secured horizontally to the inside surfaces of beams 49 and 50 of the blower or fan unit. See Figure 7 inside the car.

Figure 13:
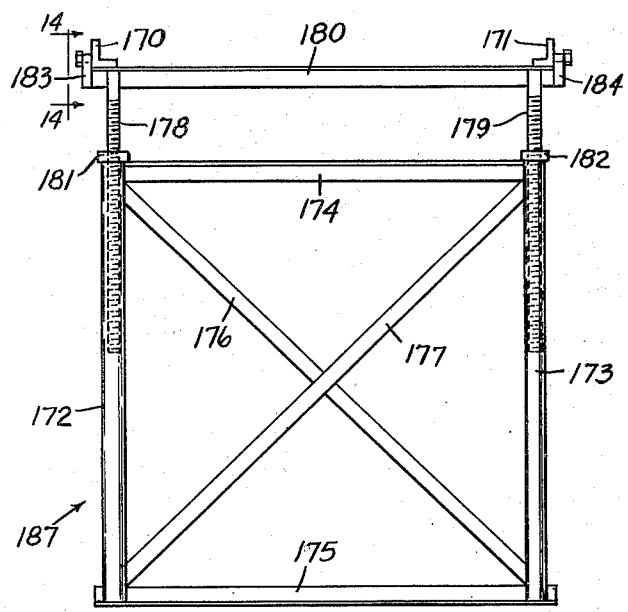
Fig. 13 is an end elevation of the support for the ends of the tracks within the car remote from the pre-cooling apparatus.
Figure 14:
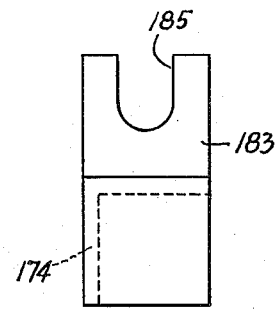
Fig. 14 is a detail view showing upon an enlarged scale the track-supporting lugs as seen upon the line 14—14, Fig. 12.
Figure 15:
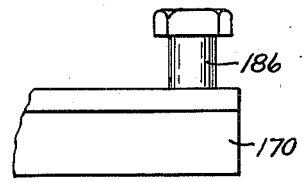
Fig. 15 is a plan view of the end of one of the two tracks within the car remote from the apparatus.

The means for supporting the apparatus within the car is disclosed at Figs. 13, 14 and 15, and consists of a pair of angle irons 170 and 171 having a length approximately equal to the width of the car. A lug is formed at one end of each of the angle irons and is adapted to drop into a hole provided in the adjacent ends of the blower supporting tracks 37 and 42 when the latter have been elevated to the proper height by operation of motor 12.

The construction is such that when the lugs are in position, the angles 170 and 171 form continuations of the tracks provided by the blower supporting tracks and thus have their horizontal flanges at the same level as the top edges of bars 37 and 42 (see Figure 6). The other ends of angles 170 and 171 are supported by a simple framework comprising upright tubes 172 and 173, interconnected at top and bottom by crosspieces 174 and 175. Brace bars 176 and 177 are provided and all parts may be welded together as shown at Fig. 13, to form a unitary frame. A pair of screws 178 and 179 slidably fit the bores of tubes 172 and 173. These screws have their tops connected by a crosspiece 180. Nuts 181 and 182 are threaded upon the respective screws 178 and 179 and each bears upon the top of its tube. Duplicate lugs 183 and 184 are welded in upright position to the ends of crosspiece 180, to project a short distance above the top edge thereof. Each lug is notched at its top edge as indicated at 185, Fig. 14, the notches being dimensioned to receive the shank of a bolt 186 such as is shown for track 170 in Fig. 15. Each bolt may be welded to its track and have a length a little greater than the thickness of lugs 183 and 184. Thus when the frame, indicated generally by the numeral 187, is in position in the car, nuts 181 and 182 are adjusted so that, when tracks 170 and 171 are in position, they are slightly above the lading at that end. When bolts 186 are seated in the notches 185 of lugs 183 and 184, the tracks are firmly held against lateral and longitudinal movement. At the other end, tracks 170 and 171 are supported by the blower tracks, as previously described, and may be adjusted to the correct elevation by operation of reversible motor 12.

Figure 16:
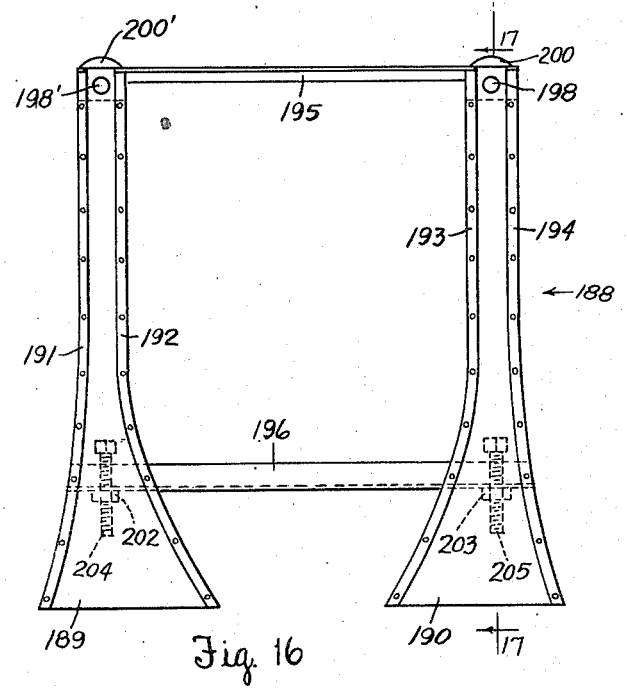
Fig. 16 is a plan view of the track guide for spanning the space between the loading platform and car.
Figure 17:
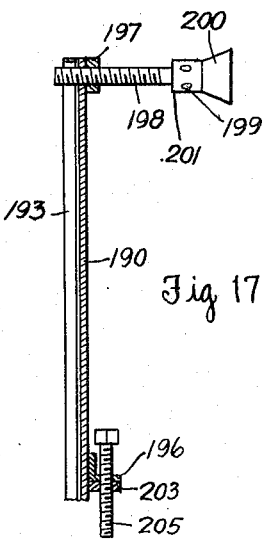
Fig. 17 is a section taken upon the line 17—17, Fig. 16, showing the supporting jacks and the screws for securing the track guide in position.

I have also provided a useful auxiliary in the form of a guide track frame for the pre-cooler, which guides and supports the same into position within the car door opening. Such frame is indicated generally by the numeral 188, Fig. 16, and comprises a pair of flat track members 189 and 190, relatively narrow at the ends within the car and flared at the ends supported upon the loading platform. Track member 189 is reinforced along its edges by lengths of angle iron 191 and 192 bolted or riveted thereto, as shown in Figs. 16 and 17. Likewise, track member 190 is reinforced by angles 193 and 194. These side angles act as guides to positively direct the pre-cooling unit into proper position within the car door opening. The two tracks thus formed are connected at one end by angle 195, and at the other end by angle 196. These are welded to the tracks to rigidly hold the same in generally parallel relation. From Fig. 17 it will be noted that a nut such as 197, is welded to the lower side of the car end of each track and is threaded to receive the screw 198 of a jack member having a base 200 relatively to which the screw may be turned by a lever inserted into holes 199 of a collar 201. This collar is fixed to the screw and is journaled in base 200, to thereby accurately adjust the elevation of the ends of the tracks within the car, as desired.

Nut members 202 and 203 are welded to the ends of the vertical flange of connector 106 and are threaded to receive screws 204 and 205. By turning these screws, their ends may be forced against the vertical side of the loading platform to thereby prevent any possibility of the track shifting away from its proper position in the car.

Operation

In using my invention, the tracks 170, 171, are first positioned over and across the lading at the car doors. The frame 187 is positioned between the load and the doors opposite those through which the machine is to be inserted into the car, and nuts 181 and 182 are adjusted so that with the tracks resting on cross piece 180, as shown in Fig. 13, the ends of the tracks are slightly spaced above the top of the lading. The other ends of the tracks may at this time, rest upon the lading. The guide track frame 188 is placed in position and its ends within the car are vertically adjusted, by means of the supporting jacks, so that the frame is substantially level. The pre-cooler is now moved over and along the tracks of frame 188 until its rear end is closely adjacent or in contact with the car lading. The electrical plug-in connections are made leading to the several motors, and motor 12 is operated until tracks 37 and 42 are at the same level as the desired level of tracks 170 and 171 within the car. The lugs on the rear ends of tracks 170 and 171 are now engaged with apertures in the ends of the blower unit tracks so as to be supported thereby at that end.

The tracks inside the car are now supported at both ends slightly above the lading.

The blower unit comprising interconnected beams 49 and 50 and parts carried thereby, as shown in Figures 1, 2, 7 and 18, is next rolled into the car. During this operation, rollers 46, 47 and 48, on beam 49, Figs. 1 and 18, roll along aligned tracks 37 and 171, and rollers 46', 47', and 48', Fig. 2, roll along algned tracks 42 and 170. When the blower unit is in position within the car, motor 61 is operated and by the mechanism previously described, elevates the blower frame, blowers 97 and 98, and their driving motors 99 and 100, into position closely adjacent the top of the car as shown in dotted lines in Fig. 2, so that the car ceiling itself acts substantially to close the top of the blower frame. This elevation of the blower frame, provides a space between beams 49 and 50 into which the cooling coil unit 206 may be moved as will be clear by reference to Figs. 7 and 18. In Fig. 18 the blower frame has been elevated to substantially its maximum height while the cooling coil frame is just a little below the proper elevation to enable its rollers 206a to roll into the car on tracks 120 and 121. Motor 157, Fig. 3, is then operated to elevate coil unit 206 until the tracks 141 and 142, Fig. 3, are aligned with tracks 120 and 121, carried by the inner sides of beams 49 and 50. The cooling coil unit is then rolled on and along the aligned tracks into position beneath the blower unit. Any necessary vertical adjustments to bring the two units into the desired cooperative relation are made by operation of motor 61. The hose connections to the cooling coil unit are made and the valves controlling the circulation of the cooling medium are opened, to circulate chilled brine or other cooling medium through the coils. Plug-in connections to the blower motors are made at 116 and 117, Fig. 8, the car doors remote from the pre-cooler are closed and sealed, and the spaces between the pre-cooler and the adjacent door opening are sealed by means of suitable baffles.

The blower motors are then started and air is drawn upwardly and chilled as it passes over the coils in unit 206. The cold air is then directed outwardly in streams toward both ends of the car whence it passes downwardly through the lading to rapidly extract heat therefrom. Operation is continued until the entire lading is reduced to the desired temperature. Meanwhile, the car having been iced, when the desired low temperature has been attained, the baffles are removed, the cooling unit is rolled out of the car and lowered on the frame by reverse operation of motor 157. The blowers are then lowered by reversal of motor 61 to their initial position between beams 49 and 50, after which the entire blower unit is rolled out of the car. The tracks 170 and 171 and frame 187 are removed and the car doors are closed and sealed. The car is now ready for transit.

Figure 21:
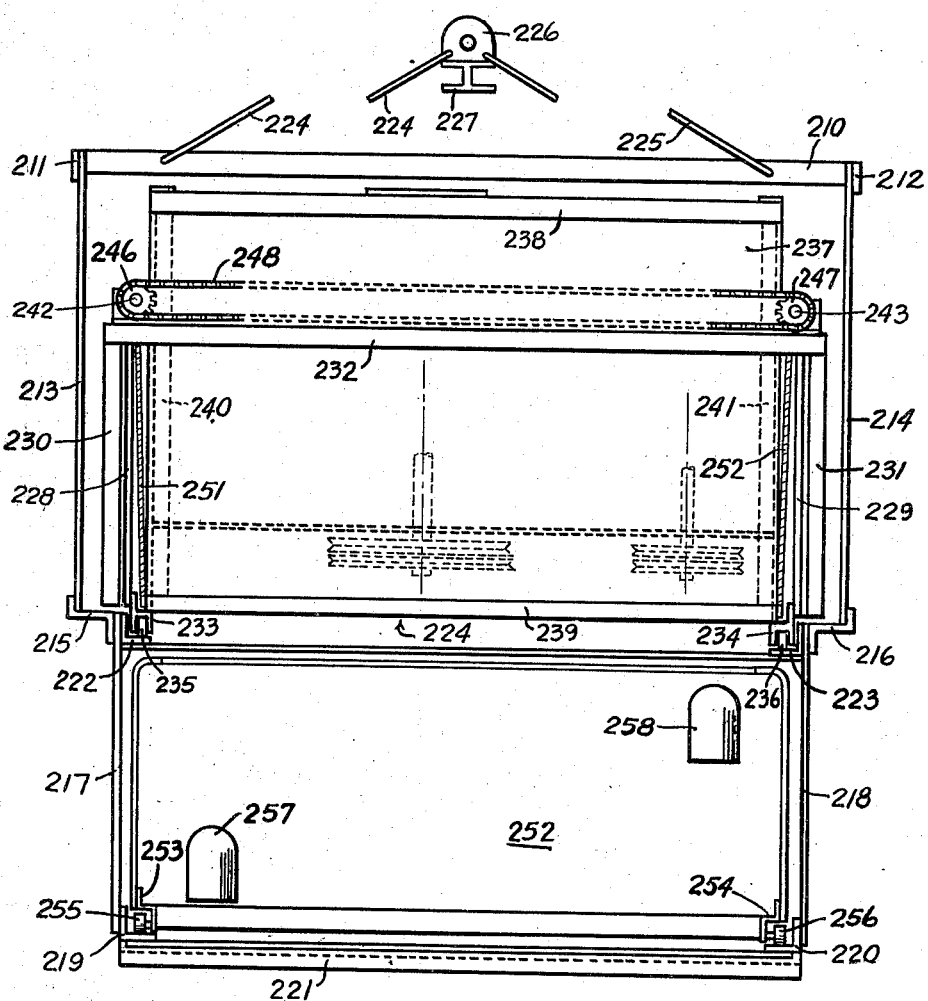
Fig. 21 is an end view of a form of the invention, using a pulley and cable arrangement for elevating the blowers within the car, and being adapted for handling by a crane.
Figure 22:
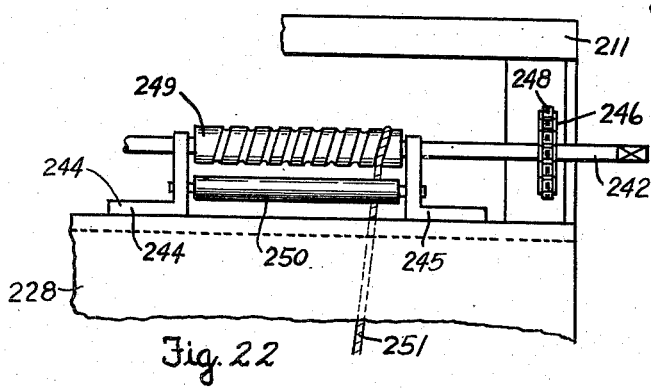
Fig. 22 is an enlarged view of a portion of Fig. 18, showing one of the cable and guide pulley units and its mounting.

In Figs. 21 and 22 I have shown a modification for use in connection with a crane mounted, for example, for movement along an overhead track parallel to and offset from the car tracks. In these figures, a built-up frame includes two or more parallel cross bars such as 210, adapted to be connected in parallel relation by a pair of stringers 211 and 212. A number of vertical strips 213 and 214 are connected at their top ends, with stringers 211 and 212, respectively, and are united at their lower ends by Z-bars 215 and 216. A number of vertical strips such as 217 and 218 are secured at their upper ends to the inside faces of the respective Z-bars and depend therefrom, being united at their lower ends by angles 219 and 220 which are held in horizontally spaced relation by angles such as 221. A second pair of angles 222 and 223 have their vertical flanges secured to the inside surfaces of the upper ends of strips 217 and 218 so that their horizontal flanges form tracks supporting the blower unit 224, as hereinafter described.

It will be understood that the strips 211, 212, Z-bars 215 and 216, and angles 219, 220, 222 and 223, are all the same length, approximately the same length or a little shorter than the blower and coil units. There will be a number of cross bars 210, one at each end of the frame, and a number of others interposed between the end cross bars. Likewise there will be a pair of strips such as 213 and 214 at each end and others equally spaced and interposed between the end pair of bars as may be found necessary to give the desired strength and rigidity to the frame. Preferably the number of pairs of strips 217 and 218 will be equal to the number of pairs 213 and 214, with each lower strip positioned immediately below the corresponding upper vertical strip. The end cross bars 210 have means for attachment to sections 224 and 225 of cable, the other ends of which are connected to respective brackets such as 226 mounted upon a spreader bar 227. Cables from a crane of any known type are connected to brackets 226 so that the entire pre-cooler may be moved along the aforesaid overhead track with the frame at right angles thereto. The crane may also be operated to raise and lower the frame as desired. The blower unit is generally of the same form and construction as in the species of Figs. 1 to 20 and includes side plates 228 and 229, reinforced by sections of angle iron such as 230 and 231 spaced at intervals along the lengths of the respective plates to form a pair of beams similar to 49 and 50, Fig. 7. These beams are connected at the end portions of their top edges by angles such as 232 to thereby form a frame having an open top, bottom and end. A pair of elongated roller supporting elements 233 and 234 are connected as shown to the lower edges of the respective plates 228 and 229. The elements 223 and 224 may be conveniently formed by welding sections of angle to one side of a plate or strip to form a structure generally h-shaped in cross-section. A number of equally spaced ball-bearing rollers 235 and 236 are journaled within the channel of elements 233 and 234 and rest upon the horizontal flanges of angles 222 and 223 whereby the entire blower unit may be translated therealong. The blowers and their driving motors are carried by a frame similar to the one shown in Fig. 7. This frame comprises a pair of end plates such as 237 reinforced at top and bottom edges by angles 238 and 239 and at their sides by angles such as 240 and 241. The sides, top and bottom of the frame are of course open except only that the sides may be partially obstructed by the blowers. A pair of shafts 242 and 243 are journaled in brackets such as 244 and 245, Fig. 22, at a desired number of points along the top edges of the plates 228 and 229. These shafts extend the full length of the blower frame and project slightly forwardly thereof at the front where they are provided with squared ends adapted to be engaged by a detachable crank. Sprockets 246 and 247 are fixed upon the forward ends of the shafts. These sprockets are connected for rotation in unison by a chain 248. Each shaft has two or more pulleys fixed thereon as shown at 249, Fig. 22. It will be noted that each pulley has a helical groove formed upon its surface and is located between a pair of mounting brackets 244 and 245. In addition each pair of brackets, mounting shaft 242, pivotally mounts a roller such as 250 and so positioned as to maintain a cable 251 adapted to be wound on pulley 249 when shaft 242 is rotated. An equal number of grooved pulleys are fixed to shaft 243 on each of which is adapted to be wound a length of cable as illustrated at 252, Fig. 21. The lower end of each length of cable is fixed to the lower side edge of the frame mounting the blowers and motors. In the models illustrated, a total of six grooved pulleys, such as 249, are used, one being located at each end of each shaft and another pulley being located at the mid-portion of the shaft. Any convenient means not shown, such as a ratchet and pawl device, may be used to hold either or both shafts in position. In the position shown in Fig. 21, the motor and blower frame is shown in lowermost position, resting on the horizontal flanges of track elements 233 and 234. This is the position in which the blower unit is moved into a car to be cooled. It will be understood, of course, that auxiliary tracks such as 170 and 171, Fig. 13, are supported within the car and that when the cooling unit is in proper elevated position before the car door, the horizontal flanges of elements 233 and 234 are in alignment with the aforesaid auxiliary tracks. Thus when the blower unit is within the car, turning of either shaft 242 or 243, will operate to raise the blowers and their driving motors into position adjacent the top of the car. At this time the frame comprising the members 210 to 223, inclusive, may be raised by operation of the crane attached to brackets 226 until the horizontal flanges of lower angles 219 and 220 are in alignment with the horizontal flanges of track elements 233 and 234. Thereupon the cooling coil unit may be moved into the car in the space between plates 228 and 229 vacated by elevation of the blower unit. The cooling coil unit may be substantially the same in construction as the one illustrated in connection with the species shown in Figs. 1 to 20. As seen in Fig. 21, the frame of this unit includes a pair of stringers 253 and 254 Z-shaped in cross section. A plurality of ball bearing rollers, such as 255 and 256, are mounted upon shafts spaced along the aforesaid stringers so that the entire unit may be easily displaced along its supporting tracks into the car in cooperative position beneath the blower unit. Supply and exhaust couplings 257 and 258 are provided, whereby chilled fluid may be circulated through the coils from a refrigerating plant exterior of the car. This cooling coil unit like the ones shown in Figs. 1 to 20 has closed sides and ends and an open top and bottom so that when the units are in position within the car air is circulated by being drawn upwardly over and about the coils and then directed laterally outward toward each end of the car.

I have thus provided a pre-cooling machine that may be placed in position in about ten minutes and removed in half that time. It is rapid, efficient and simple in operation and, above all, may be entered into the car within a minimum of space between the top of the lading and the top of the car door opening. By providing a sufficient number of pre-coolers, an entire train of cars may be serviced at the same time from a single refrigerator plant thus effecting a great saving of time in getting the crated fruit on its way to market.

By my invention, the rapid cooling of the fruit or vegetables inhibits the start of decay and reduces spoilage to a minimum. Spoilage is additionally lowered because of the saving in time between crating and the placing of the fruit upon the market. Furthermore, labor costs are reduced because the power-operated features enable the pre-cooler to be quickly placed in position and even more quickly withdrawn from the car. Shipping costs are reduced because of the increased load per car because of the fact that the blower unit is first inserted into the car, elevated into proximity to the car ceiling, after which the cooling coil unit is moved into the car to occupy the space vacated by the aforesaid elevation of the blower unit.

Many variations are possible where a battery of pre-cooling units are employed. In one arrangement, the platform P is located between two tracks and cooling liquid and current are supplied from overhead conduits extending centrally along and above the platform. Loaded cars on each track may be simultaneously pre-cooled or, as soon as a car on one track is pre-cooled, the unit used to service that car may be transferred to the car opposite upon the other track. It is also contemplated that, instead of mounting the pre-cooling units on casters 10, they may be carried by a crane upon an overhead track extending centrally between two tracks. Supply and exhaust headers for coolant, as well as power lines, may be supported to extend along and parallel with the overhead track. In this manner, the pre-cooling units may be rolled along the overhead tracks into position instead of being supported upon the platform P shown upon Fig. 2. For convenience in such an arrangement, coupling connections may be provided at each end of coil unit 206, each coupling, of course, being provided with a shut-off valve.

While I have shown a preferred form of the invention as actually built and successfully operated, numerous changes and substitutions will occur to those skilled in this art. Hence the foregoing disclosure is to be taken in an illustrative rather than a limiting sense; and it is my desire to reserve all such modifications, alterations and substitutions of equivalents as fall within the scope of the sub-joined claims.

Having now fully disclosed the invention, what I claim and desire to secure by Letters Patent is:

1. In a pre-cooling apparatus for compartments, a frame, a blower unit mounted on said frame, a cooling coil unit mounted on said frame, said units being independent but adapted to cooperate to cool and circulate gas within a compartment, and means carried by said frame to individually support said units for projection therefrom in succession, into a compartment to be cooled, and to position said units therein in juxtaposed, cooperative relationship with said cooling coil unit supported on and by said blower unit.

2. In a pre-cooling apparatus for a shipping compartment having a loading opening, a frame adapted to be positioned adjacent said opening, a blower unit mounted on said frame, a coil unit mounted on said frame and having connections whereby a heat exchange medium may be circulated therethrough from a source external of said compartment, means carried by said frame to support said units for separate and individual movement in succession into said compartment, and means to vertically move one of said units within said compartment to provide therein a space into which the other of said units may be moved juxtaposed cooperative relationship with said one unit.

3. In an apparatus for pre-cooling shipping compartments, a frame, a first pair of substantially horizontal parallel track members, first means mounting said first pair of members on said frame for elevation with respect thereto, air circulating unit mounted for translation on and along said first pair of members, said air-circulating unit including a support, a blower on said support, and means mounting said blower for elevation with respect thereto, a second pair of track members, second means mounting said second pair of track members on said frame beneath and substantially parallel to said first pair of track members and operable to elevate said second pair of track members with respect to said frame, a cooling coil unit mounted for translation on said second pair of track members, said cooling coil unit being adapted for translation into cooperative relation beneath said blower when said blower has been elevated with respect to said support.

4. A pre-cooling apparatus for a railway refrigerator car, comprising, a first supporting frame adapted to be positioned adjacent the loading opening of said car, a pair of spaced parallel, normally horizontal track members, elevator means mounting said track members on said frame, and operable to vary the elevation of said track members as a unit with respect to said frame, a second frame adapted to be positioned within said car to form a continuation of said track members within the car, a blower unit mounted for movement into said car on and along said track members and continuations thereof, said blower unit comprising a truck, a power-driven blower unit, and means carried by said truck and, in turn, supporting said blower unit, said last-named means being operable to elevate said blower unit relatively to said truck.

5. A pre-cooling apparatus for a railway refrigerator car comprising, means forming a pair of guide tracks extending transversely across said car through the door opening to the exterior thereof, an air-circulating unit comprising first, a truck mounted for guided movement on said tracks into and out of said car, secondly, a blower adapted to circulate air outwardly toward at least one end of said car, and thirdly, jack means mounting said blower on said truck and operable to elevate said blower with respect to said truck, a cooling coil unit, and track means mounting said cooling coil unit for movement into and out of said car into cooperative position with and beneath said blower when the latter has been elevated by said jack means to a position within said car and adjacent the top thereof.

6. In a pre-cooling apparatus for shipping compartments, a first frame, first and second track means, defining respective superposed first and second substantially horizontal parallel paths, power driven elevator means mounting both said track means on said frame for vertical adjustment with respect thereto, a blower unit mounted on said first track means for movement along one said path, a coil unit for circulating cooling fluid mounted on said second track means for movement along the other said path, said blower unit comprising a second frame, a blower, and elevator means between said second frame and blower, whereby said blower may be elevated with respect to said second frame.

7. The combination as specified in claim 6, the elevator means mounting said coil unit on said first frame being selectively operable to cause said second path to coincide with said first path whereby after said blower has been elevated in said compartment, said coil unit may be moved into said compartment along a path coincident with the path of movement of said blower unit into said compartment.

8. In a pre-cooler for a refrigerator car having a space between the top of the loading opening thereof and the ceiling, a blower unit, adapted to circulate the air within said car, a cooling coil unit adapted to cool said air as circulated by said blower unit, a common mobile frame on which said units are mounted externally of said car, first means carried by said frame and adapted to mount one of said units for projection into said car along a path below the top of said opening, and elevate the same into said space, and second means carried by said frame and adapted to mount the other of said units for elevation into said path and for translation along said path into said car in juxtaposed cooperative position beneath said first unit contiguous to the ceiling of the car.

9. In a pre-cooling unit for a shipping compartment, means including rails adapted to be positioned within said compartment to provide guide tracks, a blower section adapted to be guidably supported on said tracks for movement into and out of said compartment, said section including a pair of parallel beams, a power-driven blower, and jack means supporting said blower on said beams and operable to elevate the same from a first position substantially between said beams to a second position above said beams, a cooling coil section, a pair of parallel guides carried by said beams respectively, elevator means for supporting said cooling coil section externally of said compartment and operable to elevate the same to the level of said guides whereby said cooling coil section may be moved into said compartment in cooperative juxtaposed relation with and below said blower when said blower has been elevated to said second position.

10. A pre-cooling apparatus comprising a frame, first and second track means defining substantially horizontal parallel superposed paths, first and second elevating means each mounting a respective track means on said frame for vertical adjustment thereon, a blower unit mounted on said first track means for translation along the path defined thereby, a cooling coil unit mounted on said second track means for translation along the path defined thereby, whereby said units may be individually projected along said frame into a superposed cooperative relation within a compartment to be cooled.

11. In a cooling apparatus, a frame adapted to be positioned adjacent the door opening of a compartment to be cooled, first and second superposed track means defining parallel paths, means mounting said track means for independent vertical adjustment on said frame, a blower unit mounted for guided translation on and along said first track means, and a cooling coil unit mounted for guided translation on and along said second track means, whereby said units may be projected independently in cooperative superposed relation into said compartment.

12. In a pre-cooling apparatus for railway refrigerator cars, a carrier, a support including substantially horizontal first track means, means mounting said support on said carrier and operable to vertically move said support relatively to said carrier, a blower unit mounted for translation on and along said first track means, second track means, means mounting said second track means on said support, and operable to vertically move said second track means relatively to said support and first track means, and a cooling coil unit mounted for translation on and along said second track means in juxtaposed cooperative relation with said blower unit.

13. In a pre-cooling unit for railway refrigerator cars, a carrier truck, a support including a first pair of tracks, means mounting said support on said truck and operable to vertically move said support, relatively to said truck, a second pair of tracks, means mounting said second tracks on said support and operable to vertically move the same relatively to said support, all said tracks being substantially parallel, a blower unit mounted on said first pair of tracks, a cooling coil unit mounted on said second pair of tracks beneath said blower unit, said blower unit including an open-ended frame, a power-driven blower, and means mounting said blower on said frame and operable to vertically move the same between a first position within said frame and a second position above said frame, and a third pair of tracks carried by said frame to translatably support said cooling coil unit when said blower unit is positioned within a car with said blower elevated into said second position.

14. The combination specified in claim 13, and an auxiliary track support adapted to be mounted in said car above the lading therein, said first pair of tracks being vertically movable into alignment with the tracks of said auxiliary support, whereby to form therewith continuous tracks into said car for said blower unit.

15. In pre-cooling apparatus for a railway refrigerator car, a first track means adapted to be positioned within said car to extend from one opening thereof, a carrier, a second track means, first elevator means mounting said second track means on said carrier whereby said second track means may be elevated into agreement with said first track means to form therewith a continuous track when said carrier is positioned outside said car adjacent said door opening, a fan unit mounted for translation on and along said first and second track means, said fan unit comprising a pair of connected beams, power-driven fan means, and second elevator means carried by said beams and operable to raise said fan means from a first position between said beams, to a second position above said beams, to thereby provide a space between said beams, a third track means on said means, fourth track means, third elevator means mounting said fourth track means on said carrier for elevation into agreement with said third track means, to form therewith a continuous track into said car, a cooling coil unit mounted on said fourth track means, whereby said cooling coil unit may be moved into said car on and along said third track means into the space vacated by said fan means when the latter has been elevated to said second position.

16. The combination as specified in claim 15, said fan means including shrouds adapted to direct air drawn over and through said cooling coil unit toward each end of said car above the lading therein.

17. In a pre-cooler for shipping compartments, a frame, having first and second parallel track means mounted thereon, a blower unit supported on said first track means for translation therealong, a cooling coil unit supported on said second track means for translation therealong, said units being in initial superposed cooperative relation for individual movement along the respective track means.

18. In a pre-cooler for refrigerator cars, a frame having a first and second pairs of superposed parallel tracks thereon a blower unit and a cooling coil unit mounted on said respective pairs of tracks for guided translation therealong, said cooling unit comprising a pair of spaced parallel beams, a third pair of tracks, each track of said third pair being on the inner wall of a respective beam, a power-driven blower and elevator means operable to raise said blower from a first position substantially between said beams, to a second position above the same whereby said cooling coil unit may be moved on and along said third pair of tracks into cooperative relation with and beneath said blower.

19. The pre-cooler as specified in claim 18, said elevator means comprising, a pair of shafts, each journaled on a respective beam, a pair of winding spools on each shaft, a plurality of cable means each adapted to be wound on a respective spool and having its lower end attached to said blower, and means connecting said shafts for simultaneous rotation to thereby elevate said blower into said second position.

20. In a pre-cooling apparatus for a railway refrigerator car, frame means forming a first pair of horizontal track members extending over the lading in said car between loading doors and extending through one door exteriorly of said car, a fan unit mounted on said track members for translation therealong into and out of said car, said unit comprising a pair of laterally spaced beams rigidly united at their ends, a power-driven fan, and elevator means operable to move said fan from a position between said beams to a position above said beams to thereby provide a space between said beams, a second pair of horizontal track members carried by said beams, a third pair of track members, elevator means mounting said third pair of track members on said frame means for elevation into alignment with the respective tracks of said second pair of track members, and a cooling coil unit mounted for translation on and along said second and third pairs of track members into said car into the space vacated by said fan.

21. The combination as specified in claim 20, said coil unit having connections for circulating therethrough a fluid heat exchange medium from a source externally of said car.

22. In a heat exchange device, a supporting frame comprising rigidly interconnected laterally spaced parallel beams, a blower assembly, elevator means mounting said assembly on and between said beams and operable to move said assembly from a first position between said beams to a second position substantially elevated above said beams, a heat exchange unit, and track means carried by said beams for supporting said heat exchange unit for translation along and between said beams when said blower assembly is in said second position.

23. A heat exchange device as in claim 22, said track means comprising horizontal tracks carried by said beams respectively, said heat-exchange unit having rollers movable on and along said tracks, whereby said unit may be moved through an open end of said frame between said beams, into the space vacated by said blower assembly when the latter is moved to second position.

24. In a pre-cooler for a railway refrigerator car, a blower unit comprising a rigid frame including a pair of normally horizontal laterally spaced beams, a blower, means carried by said beams and mounting said blower for vertical movement therebetween from a first position between said beams to a second position above said beams, normally horizontal track means carried by said beams, and a cooling coil unit mounted for translation on and along said track means between said beams when said blower is in second position.

25. In a refrigerator device, a frame comprising closed side walls, said frame having one end, top and bottom open, a pair of parallel tracks, one said track being carried by the inside surface of a respective one of said side walls, and a heat exchange unit adapted to be supported on and by said tracks for translation between said side walls.

BROADUS WILSON.

REFERENCES CITED

The following references are of record in the file of this patent:

UNITED STATES PATENTS

| Number | Name | Date |
|---|---|---|
| 2,139,500 | Hughes | Dec. 6, 1938 |
| 2,323,439 | Adams | July 6, 1943 |
| 2,477,250 | Hincz | July 26, 1949 |